United States Patent
Cho et al.

(10) Patent No.: US 9,602,728 B2
(45) Date of Patent: Mar. 21, 2017

(54) IMAGE CAPTURING PARAMETER ADJUSTMENT IN PREVIEW MODE

(71) Applicant: QUALCOMM Incorporated, San Diego, CA (US)

(72) Inventors: Hyun-Mook Cho, Seoul (KR); Duck-Hoon Kim, Seoul (KR); Te-Won Lee, Seoul (KR); Ananthapadmanabhan Kandhadai, San Diego, CA (US); Pengjun Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 37 days.

(21) Appl. No.: 14/300,023

(22) Filed: Jun. 9, 2014

(65) Prior Publication Data
US 2015/0358549 A1 Dec. 10, 2015

(51) Int. Cl.
*H04N 5/232* (2006.01)
*G06K 9/32* (2006.01)
*G06K 9/20* (2006.01)
*H04N 5/235* (2006.01)
*G06K 9/22* (2006.01)
*H04N 1/00* (2006.01)

(52) U.S. Cl.
CPC ....... *H04N 5/23293* (2013.01); *G06K 9/2054* (2013.01); *G06K 9/228* (2013.01); *G06K 9/3241* (2013.01); *G06K 9/3258* (2013.01); *H04N 1/00* (2013.01); *H04N 5/2351* (2013.01); *H04N 5/2353* (2013.01); *H04N 5/23212* (2013.01); *H04N 5/23245* (2013.01); *G06K 2209/01* (2013.01)

(58) Field of Classification Search
None
See application file for complete search history.

(56) References Cited

U.S. PATENT DOCUMENTS

| | | | |
|---|---|---|---|
| 8,289,403 B2 | 10/2012 | Dobashi et al. | |
| 8,488,015 B2 | 7/2013 | Prentice et al. | |
| 8,537,236 B2 | 9/2013 | Yost et al. | |
| 8,553,083 B2 | 10/2013 | Kim et al. | |
| 2007/0096024 A1 | 5/2007 | Furuya et al. | |
| 2013/0039570 A1* | 2/2013 | Vincent | G06K 9/3258 382/159 |

(Continued)

OTHER PUBLICATIONS

Doermann D., et al., "Handbook of Document Image Processing and Recognition", Springer, Jan. 1, 2014, XP002744589, vol. 2, pp. 850, 851 & 860.

(Continued)

*Primary Examiner* — James Hannett
(74) *Attorney, Agent, or Firm* — Toler Law Group, PC

(57) ABSTRACT

A method, which is performed by an electronic device, for adjusting at least one image capturing parameter in a preview mode is disclosed. The method may include capturing a preview image of a scene including at least one text object based on a set of image capturing parameters. The method may also identify a plurality of text regions in the preview image. From the plurality of text regions, a target focus region may be selected. Based on the target focus region, the at least one image capturing parameter may be adjusted.

30 Claims, 12 Drawing Sheets

(56) References Cited

U.S. PATENT DOCUMENTS

2014/0111542 A1\* 4/2014 Wan .................. G06F 17/30253
　　　　　　　　　　　　　　　　　　　　　　　　345/633

OTHER PUBLICATIONS

International Search Report and Written Opinion—PCT/US2015/034497—ISA/EPO—Sep. 25, 2015.
Kumar J., et al., "Sharpness Estimation for Document and Scene Images", 21s International Conference on Pattern Recognition (ICPR 2012), IEEE, Nov. 11, 2012, XP032330049, pp. 3292-3295.

\* cited by examiner

IMAGE CAPTURING PARAMETER ADJUSTMENT IN PREVIEW MODE

TECHNICAL FIELD

The present disclosure relates generally to capturing images in electronic devices, and more specifically, to adjusting image capturing parameters in a preview mode of electronic devices.

BACKGROUND

Modern electronic devices such as cameras, smartphones, tablet computers, etc., are typically equipped with image sensors (e.g., camera modules). The image sensors are used to capture photographs of various scenes for storage and/or display in the electronic devices. After a photograph has been captured and stored, image processing functions in such electronic devices may allow a user to enhance or improve the photograph according to his or her preference. For example, some electronic devices may allow a user to view a photograph and select a desired editing function among a variety of functions such as auto-enhance, crop, rotate, red eye reduction, etc.

Conventional electronic devices equipped with an image sensor are typically used to capture photographs of a variety of types of scenes and objects. For example, such electronic devices may be used to photograph a scene that includes text objects such as a document or a sign with text and non-text objects such as flowers, walls, doors, light sources, etc. However, since the scene includes the non-text objects, the image sensor of such electronic devices may not be able to capture a photograph that is optimized for the text objects in the scene.

In addition, conventional electronic devices may be configured to focus at a predetermined portion of a scene such as a center portion of the scene rather than a portion that includes a desired text object. Accordingly, the text object in a photograph of the captured scene may not be of sufficient image quality. Some electronic devices may also allow a user to manually specify a desired portion of the scene to be focused on a display screen. However, manually selecting the desired portion of the scene while holding an electronic device may not be very convenient to the user.

SUMMARY

The present disclosure provides methods and apparatus for adjusting at least one image capturing parameter for an image sensor based on a preview image of a scene including at least one text object to capture an image including the at least one text object.

According to one aspect of the present disclosure, a method, which is performed by an electronic device, for adjusting at least one image capturing parameter in a preview mode is disclosed. The method may include capturing a preview image of a scene including at least one text object based on a set of image capturing parameters. The method may also identify a plurality of text regions in the preview image. From the plurality of text regions, a target focus region may be selected. Based on the target focus region, the at least one image capturing parameter may be adjusted. This disclosure also describes apparatus, a device, a system, a combination of means, and a computer-readable medium relating to this method.

According to another aspect of the present disclosure, an electronic device for adjusting at least one image capturing parameter in a preview mode is disclosed. The electronic device may include an image sensor configured to capture a preview image of a scene including at least one text object based on a set of image capturing parameters and a text region detection unit configured to identify a plurality of text regions in the preview image. The electronic device may also include a target focus region detection unit configured to select a target focus region from the plurality of text regions. An image sensor control unit in the electronic device may be configured to adjust the at least one image capturing parameter based on the target focus region.

BRIEF DESCRIPTION OF THE DRAWINGS

Embodiments of the inventive aspects of this disclosure will be understood with reference to the following detailed description, when read in conjunction with the accompanying drawings.

DETAILED DESCRIPTION

Reference will now be made in detail to various embodiments, examples of which are illustrated in the accompanying drawings. In the following detailed description, numerous specific details are set forth in order to provide a thorough understanding of the present subject matter. However, it will be apparent to one of ordinary skill in the art that the present subject matter may be practiced without these specific details. In other instances, well-known methods, procedures, systems, and components have not been described in detail so as not to unnecessarily obscure aspects of the various embodiments.

Figure 1:
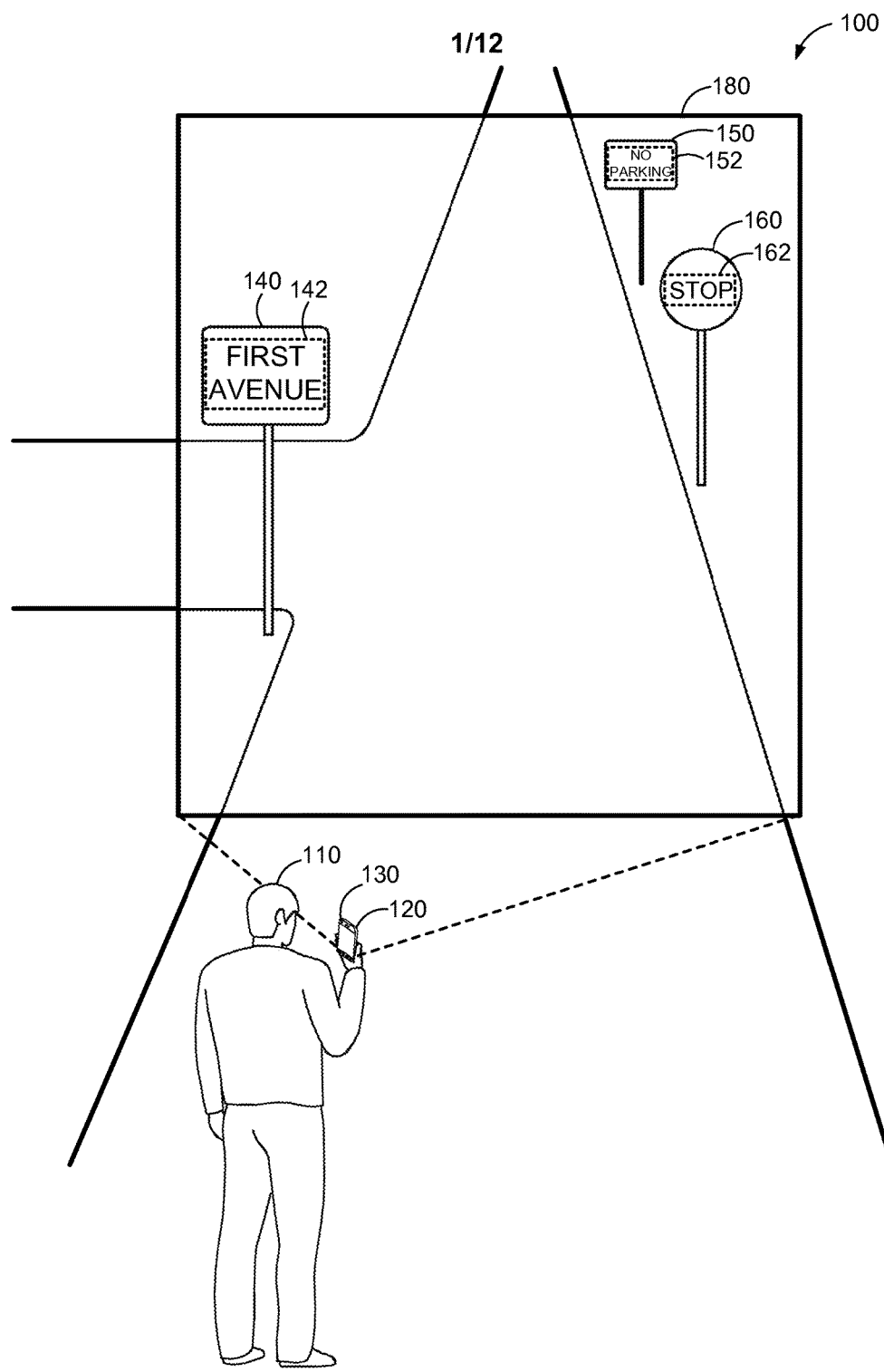
FIG. 1 illustrates an electronic device configured to operate in a preview mode to display a preview image of a scene including a plurality of text objects for adjusting at least one image capturing parameter according to one embodiment of the present disclosure.

FIG. 1 illustrates an electronic device 120 configured to operate in a preview mode to display a preview image 180 of a scene 100 including a plurality of text objects 140, 150, and 160 for adjusting at least one image capturing parameter, according to one embodiment of the present disclosure. As shown, a user 110 may operate the electronic device 120 equipped with an image sensor 130 to capture an image of the scene 100 that includes the plurality of text objects 140, 150, and 160. As used herein, the term "capture" or "capturing" may refer to converting an optical image of a scene into data or signals and storing the data or signals in a storage unit, and may include temporarily storing the data or signals in a preview mode (e.g., a real-time preview mode). The text object 140 may be a street sign including a street name "FIRST AVENUE" while the text objects 150 and 160 may be "NO PARKING" and "STOP" signs, respectively. Although the text objects 140, 150, and 160 are illustrated as a sign, they may be any object that includes, displays, or shows text (e.g., one or more characters). Further, the text objects 140, 150, and 160 may also include one or more text regions, each of which may include text or characters of a similar size, color, pattern, or the like. As illustrated herein, the electronic device 120 may be any suitable device equipped with image capturing and processing capabilities such as a digital camera (e.g., a DSLR camera), a smartphone, a wearable computer (e.g., smart glasses, a smart watch, etc.), a personal computer, a laptop computer, a tablet computer, a gaming device, etc.

The electronic device 120 equipped with the image sensor 130 may operate in the preview mode to capture and display one or more preview images for the user 110. For example, the user 110 may take a picture of the scene 100 that includes the text object 140 with the street name "FIRST AVENUE" to assist in navigating through the street or for text recognition. According to one embodiment, the electronic device 120 may be configured to be set to a text mode before or during the preview mode for capturing text in an image. In the text mode, a plurality of image capturing parameters may be set to a set of predetermined initial values suitable for capturing text in an image. For example, a set of image capturing parameters for the image sensor 130 may include a focus parameter, an exposure parameter, a white balance parameter, a contrast enhancement parameter, a zoom parameter, a sensitivity to light parameter, etc.

Before taking the picture, the user 110 may operate the electronic device 120 in the preview mode to view a preview image 180 of the scene 100. From the preview image 180, the electronic device 120 may identify a plurality of text regions 142, 152, and 162 in the text objects 140, 150, and 160, respectively, and select one of the text regions 142, 152, and 162 as a target focus region. In one embodiment, the electronic device 120 may determine a size of each of the text regions 142, 152, and 162 and select a text region having the largest text size as the target focus region. For example, in the preview image 180 of FIG. 1, the text region 142 corresponding to the text "FIRST AVENUE" in the text object 140 is larger than the text regions 152 and 162. Accordingly, the electronic device 120 may identify the text region 142 as the target focus region.

Upon identifying the target focus region 142 that includes the text "FIRST AVENUE," the electronic device 120 may determine one or more values indicative of an image quality for the target focus region 142 such as a sharpness value, a brightness value, a contrast value, a saturation value, and the like. Based on the values for the image quality of the target focus region 142, the electronic device 120 may determine at least one image capturing parameter value that is optimized or suited to capture the target focus region 142 with the text "FIRST AVENU," and adjust at least one image capturing parameter to the associated parameter value. In one embodiment, the focus parameter in the at least one image capturing parameter may be adjusted to a value adapted or suited to produce a predetermined level of sharpness for the target focus region 142. Additionally or alternatively, the exposure parameter in the at least one image capturing parameter may be adjusted to an exposure value (e.g., aperture, time, and the like) for producing a predetermined level of brightness for the target focus region 142.

Figure 2:
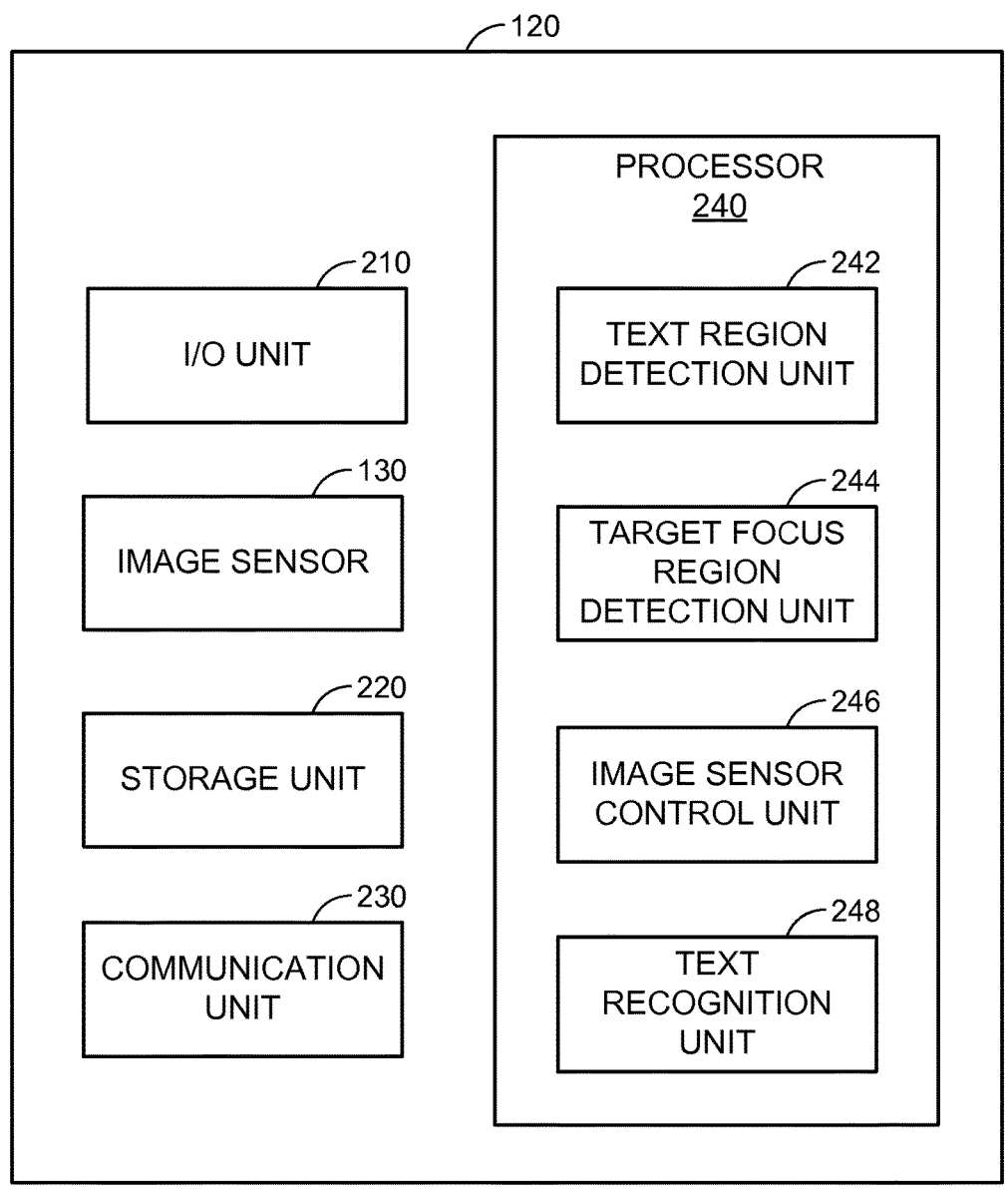
FIG. 2 is a block diagram of an electronic device configured to adjust at least one image capturing parameter based on a preview image of a scene that includes a plurality of text regions according to one embodiment of the present disclosure.

FIG. 2 is a more detailed block diagram of the electronic device 120 configured to adjust at least one image capturing parameter for the image sensor 130 based on a preview image of a scene that includes at least one text object, according to one embodiment of the present disclosure. The electronic device 120 may include an I/O unit 210, the image sensor 130, a storage unit 220, a communication unit 230, and a processor 240. The processor 240 may include a text region detection unit 242, a target focus region detection unit 244, an image sensor control unit 246, and a text recognition unit 248.

The I/O unit 210 may be configured to receive commands from the user 110 and/or output information for the user 110. For example, the I/O unit 210 may receive a command or input from the user 110 to select one of the camera modes (e.g., an autofocus mode, a text mode, a night mode, a portrait mode, etc.). Based on the selected camera mode, the image sensor 130 may operate in a preview mode to capture one or more preview images of a scene. In the preview mode, the captured preview images may be temporarily stored in the storage unit 220 and displayed on the I/O unit 210. The image sensor 130 may be any device capable of capturing or sensing an image of a scene or an object such as a camera or a camera module.

While operating in the selected camera mode, the I/O unit 210 may receive a command or input for capturing an image of the scene from the user 110. In response to the command or input, the image of the scene may be captured by the image sensor 130 and stored in the storage unit 220 and/or displayed on the I/O unit 210. As illustrated herein, the I/O unit 210 may be any suitable device capable of receiving commands and/or outputting information and include a touch screen, a dial, a button, a keypad, a touchpad, a display screen, or the like.

The storage unit 220 may be configured to temporarily store the preview images captured during the preview mode.

For example, the storage unit 220 may store data for each of the preview images including image data and a size of the image (e.g., a width and a height). In this case, the image data may include pixel information such as a number of pixels and color values for the pixels. The preview images may be accessed by the processor 240 to adjust at least one image capturing parameter value for the image sensor 130.

The storage unit 220 may store a classifier database that may be used for identifying one or more text regions in a preview image. In one embodiment, the classifier database may include a probability model for each of a predetermined number of languages (e.g., English, French, and the like) that can be used to determine a probability that given text is associated with the language. The storage unit 220 may also store a character information database that may be used for recognizing a plurality of characters associated with the languages. For each of the languages, the character information database may include patterns or geometric data of a plurality of characters used in the language, images of glyphs representing the plurality of characters in the language, and/or at least one feature associated with each individual glyph in the language. Additionally, the storage unit 220 may store a dictionary database of the languages for use in recognizing one or more words in a text region. For example, the dictionary database may include a plurality of words mapped to the languages.

In some embodiments, the storage unit 220 may store size information for a plurality of reference objects such as a license plate, a price tag, etc. that may include one or more text regions of predetermined sizes. For example, the size information for each of the reference objects may include a size for each of the text regions or one or more characters in the text regions. The storage unit 220 may be implemented using any suitable storage or memory devices such as a RAM (Random Access Memory), a ROM (Read-Only Memory), an EEPROM (Electrically Erasable Programmable Read-Only Memory), a flash memory, or an SSD (solid state drive).

The processor 240 may access one or more preview images of a scene including one or more text objects in the storage unit 220 to determine one or more image capturing parameter values for the image sensor 130. The processor 240 may then adjust one or more image capturing parameters for the image sensor 130 to the determined one or more image capturing parameter values. Configured with the one or more adjusted image capturing parameters, the image sensor 130 may then capture an image of the scene automatically or in response to an input from the user 110. For example, the image may be captured automatically upon or after adjusting the image capturing parameters or manually when the user 110 enters a command to take a picture of the scene by pressing a shutter button or activating an image capturing function for the image sensor 130.

The text region detection unit 242 in the processor 240 may be configured to receive one or more preview images of a scene from the storage unit 220 and detect one or more text regions in each of the preview images. In this process, one or more candidate text regions may be detected in a preview image based on any suitable text candidate extraction schemes using a blob clustering method, an edge based method, a connected-component based method, a texture based method, or the like. Upon detecting the candidate text regions, the text region detection unit 242 may extract a set of features from each of the candidate text regions in the preview image. A classification score may then be generated for the set of features based on the classifier database from the storage unit 220. Based on the classification scores associated with the candidate text regions, the text region detection unit 242 may identify one or more text regions in the preview image. The identified text regions and the associated classification scores may be provided to the target focus region detection unit 244 for selecting a target focus region from the text regions.

According to one embodiment, upon detecting the candidate text regions in the preview image, the text region detection unit 242 may access another preview image of the scene captured at a higher resolution and obtain candidate text regions from the higher resolution image that correspond to the detected candidate text regions. In this case, the image sensor 130 may be configured to capture a plurality of preview images of a scene based on a plurality of image resolutions. For example, a first preview image may be captured at a predetermined resolution (e.g., 320×240) and temporarily stored in the storage unit 220. Additionally, a second preview image of the scene may also be captured at a resolution higher than the preview image (e.g., 1280×720) and temporarily stored in the storage unit 220. In some embodiments, the preview images of both resolutions may be stored in a buffer memory, which may be a region in the storage unit 220 or a dedicated image buffer, for access by the processor 240.

The text region detection unit 242 may then access the first preview image to identify one or more candidate text regions in the first preview image and detect a location (e.g., pixel coordinates) for each of the candidate text regions. The text region detection unit 242 may also access the second preview image and determine corresponding candidate text regions in the second preview image that map to the locations of the detected candidate text regions in the first preview image. The text region detection unit 242 may then extract a set of features from each of the candidate text regions in the second preview image, and generate a classification score for the set of features for use in identifying a plurality of text regions in the first preview image. By using the candidate text regions from the higher resolution image, text regions in the first preview image having a lower resolution may be detected more accurately.

In an alternative embodiment, the text region detection unit 242 may identify the text regions from the candidate text regions based on text recognition results. For example, the text region detection unit 242 may provide one or more candidate text regions in a preview image to the text recognition unit 248, which may perform text recognition on the candidate text regions. The text recognition unit 248 may then provide results of the text recognition for the candidate text regions to the text region detection unit 242. Based on the text recognition results, the text region detection unit 242 may identify one or more candidate text regions as one or more text regions. For instance, if the results indicate that text in a candidate text region is recognized, the candidate text region may be identified as a text region.

The target focus region detection unit 244 in the processor 240 may be configured to receive the identified text regions of the preview image and associated classification scores from the text region detection unit 242 and select a target focus region from the text regions. In one embodiment, a text region having a greatest classification score, which may indicate a greatest likelihood of being text in a predetermined language, may be selected as the target focus region. In another embodiment, the target focus region detection unit 244 may select the target focus region by determining a size for each of the text regions. In this case, a text region having a largest size may be selected as the target focus region.

In some embodiments, upon selecting a target focus region in a preview image of a scene, the target focus region detection unit 244 may temporarily store information on the target focus region for the preview image in the storage unit 220. The target focus region information may include a location and a size of the target focus region in the preview image, color values for pixels in the target focus region, etc. The target focus region detection unit 244 may receive a plurality of text regions identified in one or more subsequent preview images of the scene from the text region detection unit 242. By accessing the target focus region information in the storage unit 220, the target focus region detection unit 244 may then select the target focus region from the text regions in each of the subsequent preview images based on any suitable target motion analysis scheme such as a maximum likelihood estimator method, an extended Kalman filter method, a regularized particle filter method, etc. Thus, the target focus region in each of the preview images of the scene may be tracked while the image sensor 130 operates in a text mode, which may be selected by the user 110. The target focus region detection unit 244 may then provide the target focus region in each of the preview images of the scene to the image sensor control unit 246.

The image sensor control unit 246 in the processor 240 may be configured to receive the selected target focus region for the preview image and adjust at least one image capturing parameter for the image sensor 130 based on the target focus region. In one embodiment, the image sensor control unit 246 may adjust the exposure parameter for the image sensor 130 based on a brightness value of the target focus region. For example, a difference between the brightness value of the target focus region and a predetermined brightness value may be determined. In this case, the predetermined brightness value may be a value optimized or suited to capture text (e.g., characters) in a reference text region (e.g., a sample text region). The exposure parameter for the image sensor 130 may then be adjusted to an exposure value that reduces or eliminates the difference between the brightness value of the target focus region and the predetermined brightness value.

In some embodiments, the image sensor control unit 246 may configure the image sensor 130 to sequentially capture and store a plurality of preview images of a scene in the preview mode based on a plurality of candidate focus parameter values. In this preview mode, each of the captured preview images may include one or more text regions, one of which may be selected as the target focus region upon processing by the text region detection unit 242 and the target focus region detection unit 244. The image sensor control unit 246 may receive the target focus regions in the preview images and determine a sharpness value for each of the target focus regions. Among the target focus regions, the image sensor control unit 246 may identify a target focus region with a highest sharpness value and select the candidate focus parameter value associated with the identified target focus region. The image sensor control unit 246 may then adjust the focus parameter for the image sensor 130 to the selected candidate focus parameter value for use in capturing an image of the scene in the text mode.

According to another embodiment, the image sensor control unit 246 may adjust the focus parameter by determining whether the target focus region is associated with a reference object with known size information. In this case, if the target focus region is determined to be associated with one of the reference objects stored in the storage unit 220, the image sensor control unit 246 may determine a size of the target focus region or a size of one or more characters in the target focus region in the preview image. Given a focal length for the preview image, a value for the focus parameter may be calculated based on the size information of the reference object and the size of the target focus region or the size of the characters in the target focus region. The image sensor control unit 246 may then adjust the focus parameter for the image sensor 130 to the focus parameter value. Additionally or alternatively, the image sensor control unit 246 may adjust a white balance parameter, a contrast enhancement parameter, a zoom parameter, or a sensitivity to light parameter to a parameter value optimized to or suited to capture the target focus region in the preview mode.

Upon adjusting one or more image capturing parameters, the image sensor 130 may capture, automatically or in response to an input from the user 110, an image of the scene including at least the target focus region and store the image in the storage unit 220. The text recognition unit 248 may receive the captured image and perform text recognition on the target focus region in the captured image based on the character information database or the dictionary database from the storage unit 220. In one embodiment, the captured image may be displayed on the I/O unit 210 by superimposing the recognized text for the target focus region in the image. Additionally or alternatively, the recognized text may be translated into one or more other languages for display on the I/O unit 210. The recognized or the translated text may be stored in the storage unit 220 or transmitted to another electronic device via the communication unit 230.

Although it is described above that one target focus region is utilized for adjusting at least one image parameter for the image sensor 130, it will be appreciated that the image sensor control unit 246 may adjust the at least one image capturing parameter based on a plurality of target focus regions. According to one embodiment, the target focus region detection unit 244 may select a plurality of target focus regions from the text regions that may be received form the text region detection unit 242. In one example, two text regions having a first greatest classification score and a second greatest classification score, respectively, may be selected from the received text regions as the target focus regions. In another example, the target focus region detection unit 244 may select the text regions having a first largest size and a second largest size, respectively, from the received text regions as the target focus regions. The selected text regions may be provided to the image sensor control unit 246 and be used for adjusting the at least one image capturing parameter. For example, the image sensor control unit 246 may adjust the exposure parameter for the image sensor 130 by determining an arithmetic mean of a plurality of brightness values of the target focus regions. Additionally or alternatively, the focus parameter for the image sensor 130 may be adjusted such that an arithmetic mean of a plurality of sharpness values of the target focus regions is increased.

Figure 3:
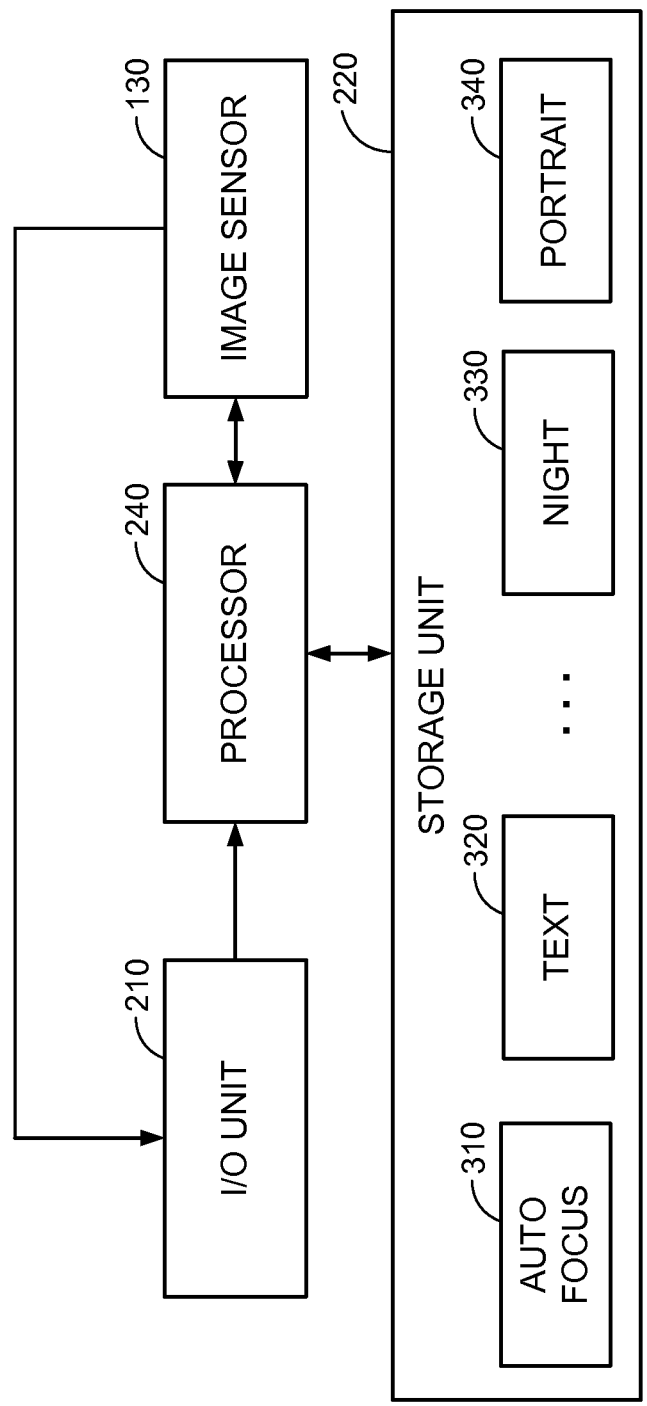
FIG. 3 illustrates a block diagram of a storage unit configured to store a plurality of camera modes for setting an image sensor to one of the camera modes in response to a mode selection input according to one embodiment of the present disclosure.

FIG. 3 is a more detailed block diagram of the storage unit 220 configured to store a plurality of camera modes for setting the image sensor 130 to one of the camera modes in a mode selection input, according to one embodiment of the present disclosure. In one embodiment, the I/O unit 210 may receive a command or input from the user 110 to select one of the camera modes such as an autofocus mode 310, a text mode 320, a night mode 330, a portrait mode 340, etc. that are stored in the storage unit 220. Each of the camera modes may be characterized by a set of image capturing parameter values that is optimized or suited for capturing images according to the camera mode. When the text mode is selected by the user 110, the I/O unit 210 may provide the selected text mode to the image sensor control unit 246 in the processor 240.

The image sensor control unit 246 in the processor 240 may then access a set of image capturing parameter values associated with the text mode from the storage unit 220 and configure the image sensor 130 with the image capturing parameter values. Based on the image capturing parameter values for the text mode, the image sensor 130 may operate in a preview mode to capture one or more preview images of a scene, which may include at least one text object such as a sign or a document. In the preview mode, one or more preview images of the scene may be captured and displayed on the I/O unit 210 for the user 110. Each of the preview images may include one or more text regions for the at least one text object in the scene, and then be processed for adjusting at least one image capturing parameter for the image sensor 130.

Figure 4:
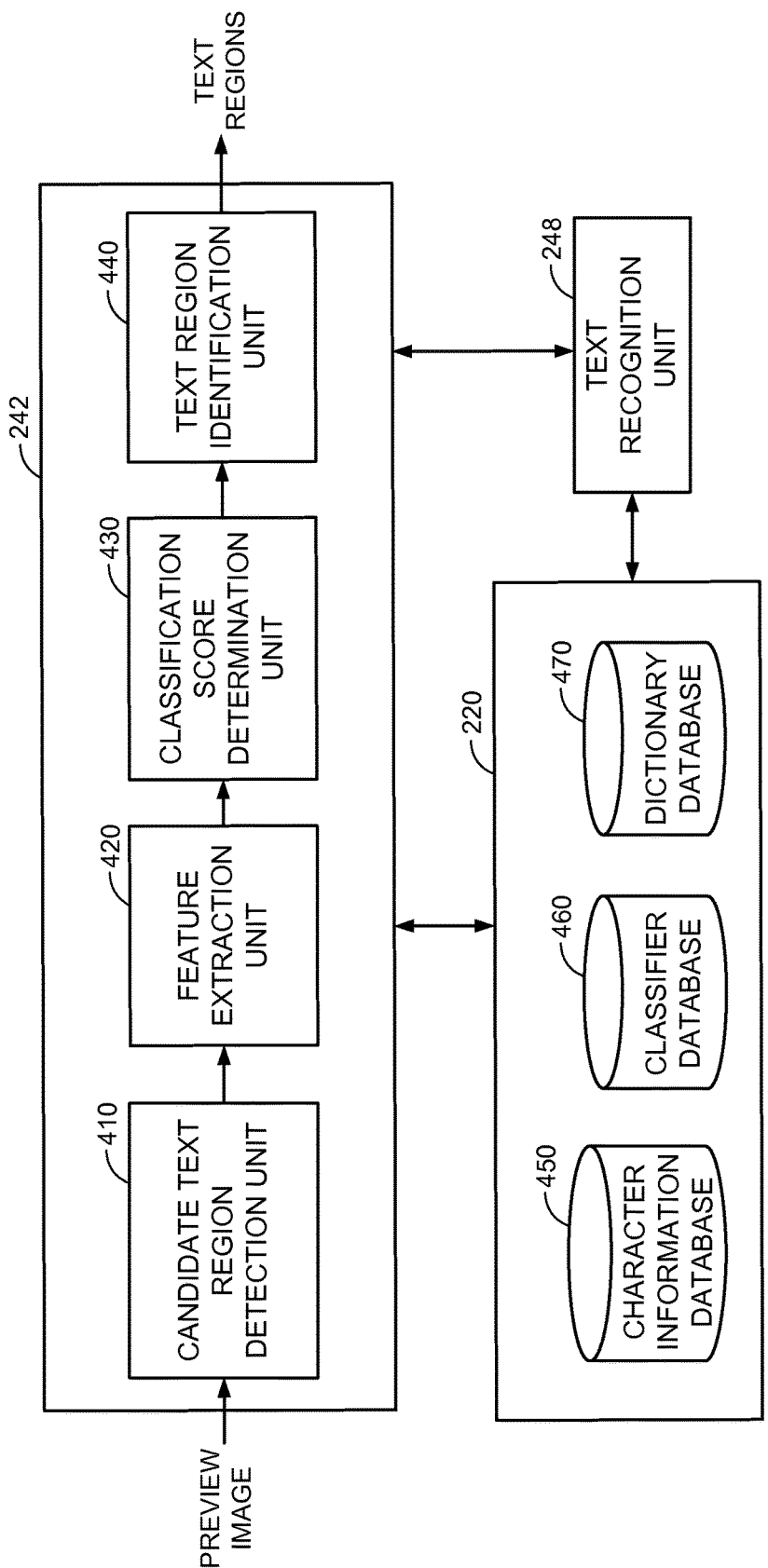
FIG. 4 is a block diagram of a text region detection unit configured to identify a plurality of text regions in a preview image according to one embodiment of the present disclosure.

FIG. 4 is a more detailed block diagram of the text region detection unit 242 configured to identify a plurality of text regions in a preview image according to one embodiment of the present disclosure. The text region detection unit 242 may include a candidate text region detection unit 410, a feature extraction unit 420, a classification score determination unit 430, and a text region identification unit 440. To identify the plurality of the text regions, the text region detection unit 242 may communicate with the storage unit 220 and the text recognition unit 248, respectively.

In the text region detection unit 242, the candidate text region detection unit 410 may be configured to receive one or more preview images and detect one or more candidate text regions in the preview images. In one embodiment, a candidate text region in a preview image may be detected by determining one or more blobs with one or more similar properties such as size, color, pattern, and the like in the candidate text region. Upon determining the blobs in the preview image, the candidate text region detection unit 410 may cluster the blobs in a blob clustering operation. For example, a plurality of blobs having a same color and located in proximity may be clustered into a blob cluster. Each of the blob clusters may also be corrected for skew and filtered to remove artifacts. In addition, a blob cluster in color may be converted into a blob cluster in gray scale. In another embodiment, one or more candidate text regions may be detected in a preview image based on any other suitable text candidate extraction schemes such as an edge based method, a connected-component based method, a texture based method, or the like. The candidate text regions detected in the preview images may then be provided to the feature extraction unit 420 in the text region detection unit 242 and/or the text recognition unit 248 in the processor 240.

The feature extraction unit 420 may be configured to receive the candidate text regions from the candidate text region detection unit 410 and extract one or more features from each of the candidate text regions. The features may be extracted from the candidate text region by using any suitable feature extraction techniques such as an edge detection technique, a scale-invariant feature transform technique, a template matching technique, a Hough transform technique, etc. In one embodiment, one or more features that are extracted from the candidate text region may be represented as a feature vector. The features extracted from the candidate text regions may then be provided to the classification score determination unit 430 in the text region detection unit 242.

The classification score determination unit 430 may be configured to receive one or more features for each of the candidate text regions from the feature extraction unit 420 and generate a classification score for a predetermined language. From the storage unit 220, a classifier model database 460 associated with a plurality of languages (e.g., English, French, German, and the like) may be accessed for identifying whether a candidate text region includes text (e.g., characters) associated with the predetermined language. The classifier model database 460 may include a plurality of probability models associated with the plurality of languages. A probability model may be generated using any suitable classification method such as SVM (Support Vector Machine), neural network, MQDF (Modified Quadratic Discriminant Function), etc. For example, a probability model for a language may be represented by a probability distribution function (e.g., a multivariate Gaussian distribution) for features that correspond to the language.

In one embodiment, the classification score determination unit 430 may generate a classification score for each of the candidate text regions based on the extracted features for the associated candidate text region and a probability model for the predetermined language. For example, if a language for identifying a text region is predetermined as English by an input or command of the user 110, a classification score for a candidate text region may be generated based on the probability model for English. The classification score for the candidate text region may indicate a probability that one or more features for the candidate text region are associated with the probability model for English. In another embodiment, the classification score determination unit 430 may determine a plurality of classification scores for the plurality of probability models based on one or more features for each of the candidate text regions to identify whether the candidate text region includes text that is associated with each of the languages for the probability models. The classification scores for the candidate text regions may then be provided to the text region identification unit 440 in the text region detection unit 242.

According to some embodiments, the text region identification unit 440 may be configured to identify one or more text regions from the candidate text regions based on the classification scores received from the classification score determination unit 430. For example, a candidate text region may be identified as a text region by determining that a classification score for the candidate text region exceeds a predetermined threshold score. Alternatively, if the classification scores associated with the plurality of languages for each of the candidate text regions are received, the text region identification unit 440 may select a greatest classification score from the classification scores and determine that the greatest classification score is higher than a predetermined threshold score.

In some other embodiments, the text region identification unit 440 may also identify one or more text regions from the candidate text regions based on text recognition results received from the text recognition unit 248. The text recognition unit 248 may receive a plurality of candidate text regions from the candidate text region detection unit 410 and perform text recognition on each of the candidate text regions by accessing the character information database 450 or the dictionary database 470 in the storage unit 220. The text recognition unit 248 may then provide results of the text recognition for the candidate text regions to the text region identification unit 440 for identifying the text regions.

One or more characters in each of the candidate text regions may be recognized based on the character information database 450 for a predetermined number of languages using any suitable character recognition schemes such as matrix matching, feature matching, etc. In some embodiments, the text recognition unit 248 may parse through text in each of the candidate text regions to determine character information in the text of the candidate text region. The character information may include pattern or geometric data of one or more characters in a language, images of glyphs representing one or more characters in the language, and/or at least one feature for one or more characters associated with individual glyphs in the language.

In each of the candidate text regions, the text recognition unit 248 may recognize one or more characters by comparing the character information identified from the text in the candidate text region and the character information database 450 associated with the languages. For example, the text recognition unit 248 may identify patterns or symbols in the candidate text region and compare the patterns or symbols with the pattern or geometric data of a plurality of characters from the character information database 450. In this case, if a similarity between one or more identified patterns or symbols and pattern or geometric data for a specified character in a language is determined to exceed a predetermined threshold, the patterns or symbols may be recognized as the specified character. If the characters in the candidate text region are recognized, the text recognition results for the candidate text region may be provided to the text region identification unit 440 for identifying the text regions.

When performing text recognition on each of the candidate text region, the text recognition unit 248 may also access the dictionary database 470 stored in the storage unit 220. The text recognition unit 248 may search the dictionary database 470 for a word, which is detected from one or more recognized characters in the candidate text region. If the word is found in the dictionary database 470, the text recognition unit 248 may determine that the candidate text region includes text associated with the language. In this case, the text recognition unit 248 may provide the results that text is recognized in the candidate text region to the text region identification unit 440 for identifying the text regions. The identified text regions may then be provided to the target focus region detection unit 244.

Figure 5:
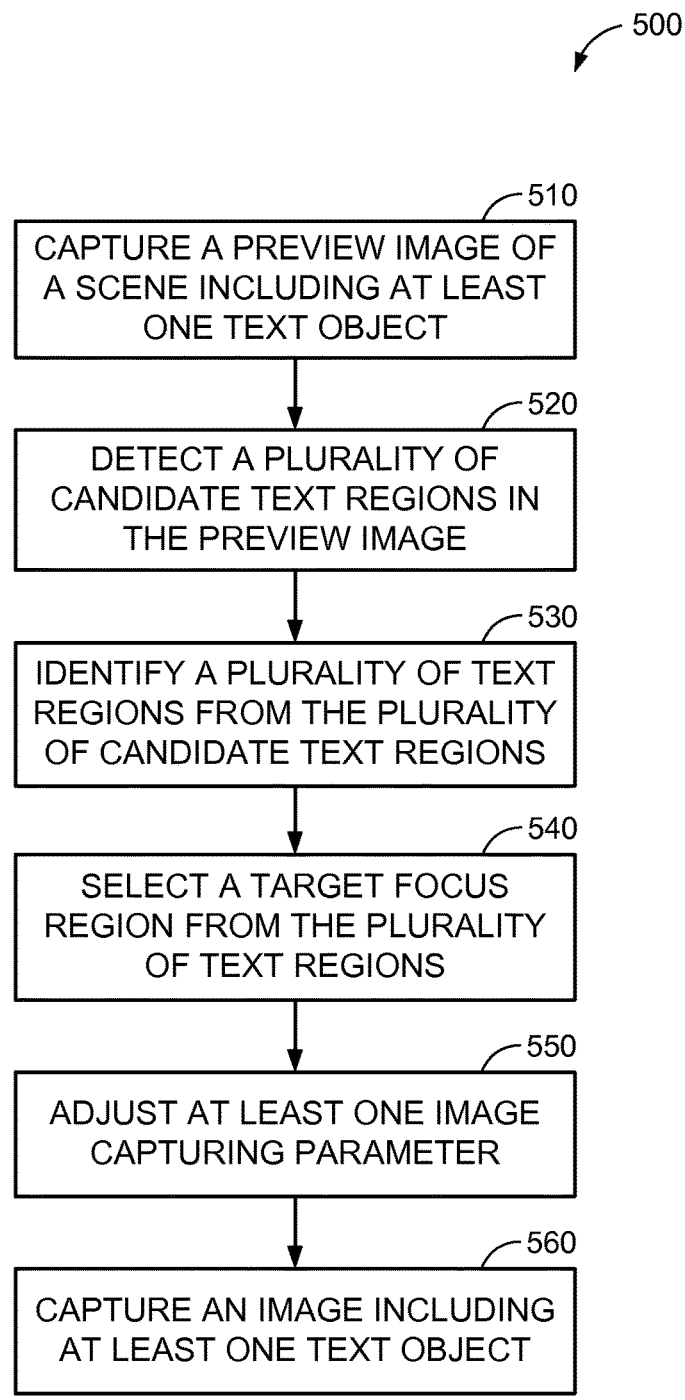
FIG. 5 is a flowchart of a method for capturing an image of a scene by adjusting at least one image capturing parameter for an image sensor in a preview mode according to one embodiment of the present disclosure.

FIG. 5 is a flowchart 500 of a method for capturing an image of a scene by adjusting at least one image capturing parameter for the image sensor 130 in a preview mode according to one embodiment of the present disclosure. Initially, the image sensor 130 may capture a preview image of a scene including at least one text object based on a set of image capturing parameters and provide the preview image to the processor 240, at 510. The text region detection unit 242 in the processor 240 may receive the preview image and detect a plurality of candidate text regions in the preview image, at 520.

At 530, the text region detection unit 242 may identify a plurality of text regions from the plurality of candidate text regions. In this process, a classification score for each of the text regions may be generated by extracting a set of features for the associated text region. The target focus region detection unit 244 in the processor 240 may select a target focus region from the plurality of text regions, at 540. Based on the target focus region, the image sensor control unit 246 in the processor 240 may adjust at least one image capturing parameter for the image sensor 130, at 550. According to the at least one image capturing parameter as adjusted, the image sensor 130 may capture an image including the at least one text object, at 560.

Figure 6:
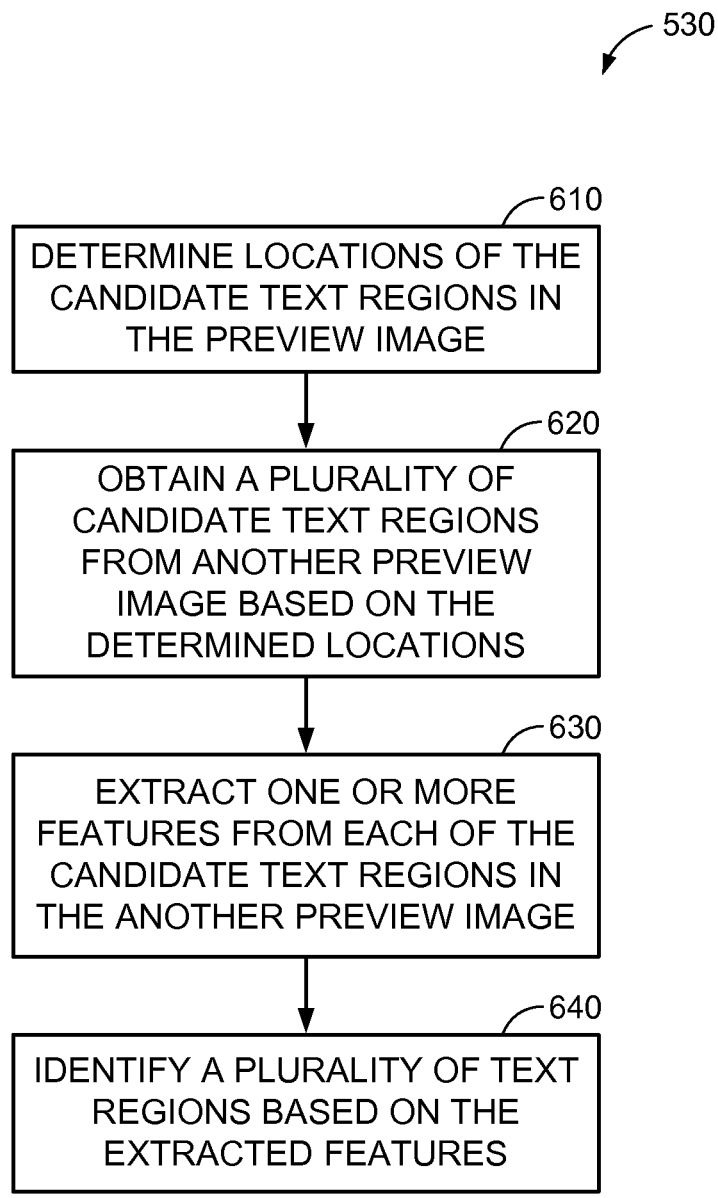
FIG. 6 illustrates a flowchart of a method for identifying a plurality of text regions in a preview image of a scene based on a plurality of candidate text regions in another preview image of the scene at a higher resolution than the preview image, according to one embodiment of the present disclosure.

FIG. 6 is a flow chart of a detailed method 530 for identifying a plurality of text regions in a preview image of a scene based on a plurality of candidate text regions in another preview image of the scene captured at a resolution higher than the preview image, according to one embodiment of the present disclosure. The text region detection unit 242 may determine locations of the plurality of candidate text regions in identifying the plurality of candidate text regions in the preview image, at 610. For example, a location of each of the candidate text regions may indicate a pixel coordinate in the preview image.

At 620, the text region detection unit 242 may access the another preview image and obtain corresponding candidate text regions in the another preview image that map to the locations of the candidate text regions in the preview image. From each of the candidate text regions in the another preview image, the text region detection unit 242 may extract one or more features and generate a classification score for the features, at 630. Based on the classification scores associated with the candidate text regions, the plurality of text regions in the preview image may be identified, at 640.

Figure 7:
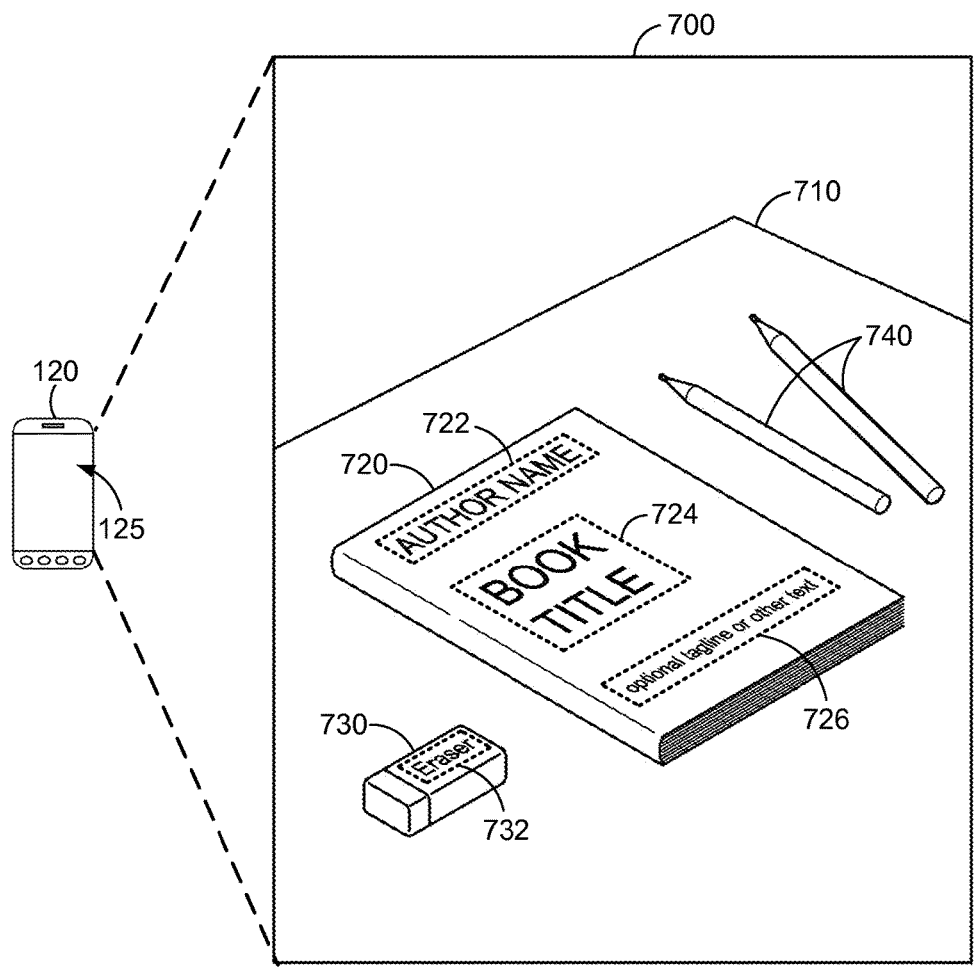
FIG. 7 is a preview image of a scene including a plurality of text objects as displayed on a display screen of an electronic device according to one embodiment of the present disclosure.

FIG. 7 is a preview image 700 of an indoor scene including a plurality of text objects such as a book 720, an eraser 730, and a plurality of pencils 740 laid on a table 710 as displayed on a display screen 125 of the electronic device 120 according to one embodiment of the present disclosure. In the preview image 700, the book 720 includes a text region 722 including text for "AUTHOR NAME," a text region 724 including text for "BOOK TITLE," and a text region 726 including text for "optional tagline or other text." The preview image 700 also shows a text region 732 in the eraser 730 that includes text for "Eraser."

According to some embodiments, the I/O unit 210 may receive an input from the user 110 during a preview mode for selecting a text mode from a plurality of camera modes. The text region detection unit 242 in the electronic device 120 may then identify the text regions 722, 724, 726, and 732 in the text mode by generating a classification score for each of the text regions 722, 724, 726, and 732 as described in detail with reference to FIGS. 2 and 4 above. The identified text regions 722, 724, 726, and 732 and the generated classification scores may be provided to the target focus region detection unit 244 in the electronic device 120 for selecting a target focus region in the preview image 700.

The target focus region detection unit 244 may select a target focus region from the identified text regions 722, 724, 726, and 732 based on the associated classification scores. In one embodiment, the target focus region detection unit 244 may select a text region having a greatest classification score as the target focus region from the text region 722, 724, 726, and 732. For example, in the preview image 700 of FIG. 7, if the text region 732 for the text "Eraser" has a greatest classification score among the text regions 722, 724, 726, and 732, the text region 732 in the eraser 730 may be selected as the target object for use in adjusting at least one image capturing parameter for the image sensor 130. In some embodiments, a text region having a greatest classification score may be selected as the target focus region only if the greatest classification score for the text region is greater than a threshold classification score.

The target focus region detection unit 244 may select the target focus region by determining a size for each of the text regions 722, 724, 726, and 732. In one embodiment, a text region having a largest size may be selected from the text regions 722, 724, 726, and 732 as the target focus region. As shown in FIG. 7, the text region 724 for the text "BOOK TITLE" in the book 720 has a largest size among the text regions 722, 724, and 726, and be selected as the target focus region in the preview image 700. The selected target focus region 724 may then be provided to the image sensor control unit 246 in the processor 240.

Figure 8:
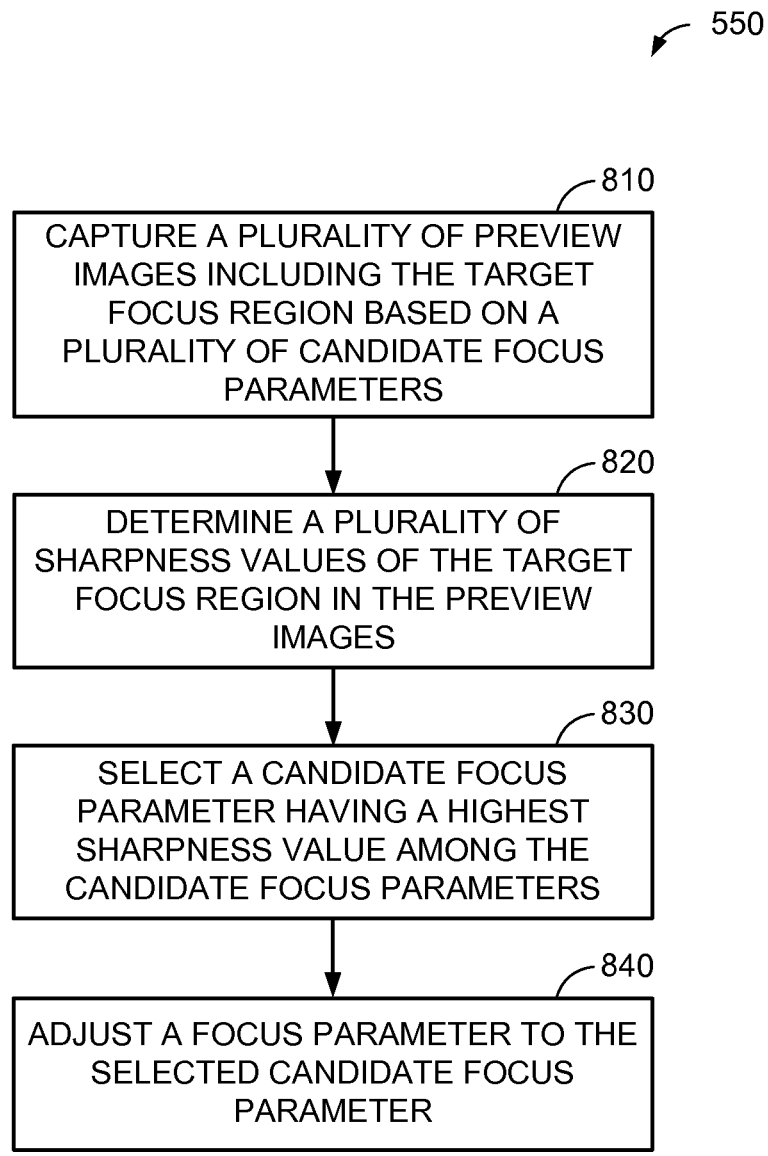
FIG. 8 is a flowchart of a method for adjusting a focus parameter for an image sensor based on a plurality of preview images of a scene in a preview mode according to one embodiment of the present disclosure.

FIG. 8 is a flow chart of a detailed method 550 for adjusting a focus parameter for the image sensor 130 based on a plurality of preview images of a scene in a preview mode, according to one embodiment of the present disclosure. Initially, the image sensor 130 may capture a plurality of preview images including the target focus region based on a plurality of candidate focus parameters, at 810. After the preview images are captured, a plurality of text regions may be identified from each of the captured preview images by the text region detection unit 242 in the processor 240 and the target focus region may be selected among the identified text regions by the target focus region detection unit 244 in the processor 240, as described in detail with reference to FIGS. 2 and 7 above. In one embodiment, the target focus region detection unit 244 may receive the target focus region in the preview image of the scene and track the target focus region in the subsequent preview images of the scene using any suitable target motion analysis scheme such as a maximum likelihood estimator method, an extended Kalman filter method, a regularized particle filter method, etc.

At 820, the image sensor control unit 246 may determine a plurality of sharpness values of the target focus region in the preview images. Among the candidate focus parameters, a candidate focus parameter associated with a highest sharpness value may be selected, at 830. At 840, the image sensor control unit 246 may then adjust the focus parameter for the image sensor 130 to the selected candidate focus parameter.

Figure 9:
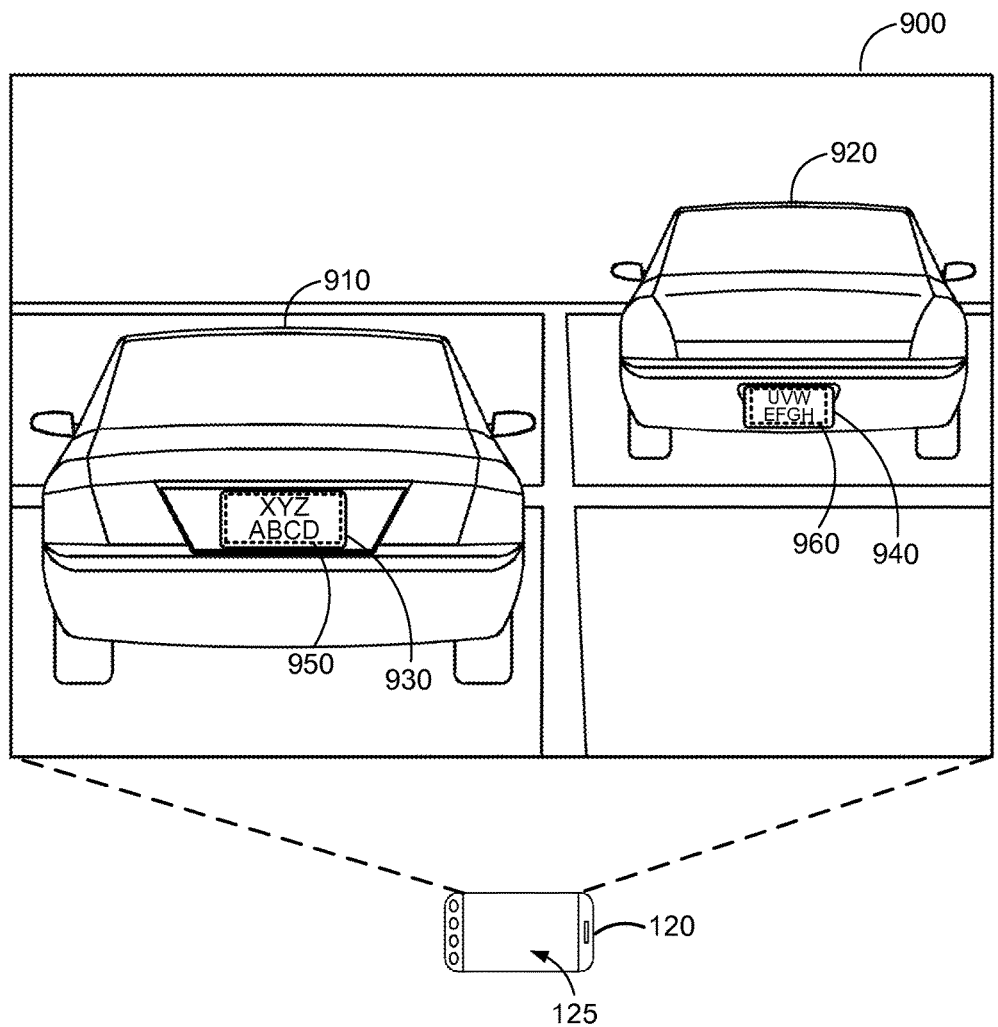
FIG. 9 illustrates a preview image of a scene including a plurality of vehicles as displayed on a display screen of an electronic device according to one embodiment of the present disclosure.

FIG. 9 illustrates a preview image 900 of a scene including a plurality of vehicles 910 and 920 as displayed on the display screen 125 of the electronic device 120 according to one embodiment of the present disclosure. The preview image 900 may be captured based on a predetermined focal length for the image sensor 130 during a preview mode, in which the image sensor 130 may be configured to operate in a text mode as selected by the user 110. In the preview image 900, the vehicles 910 and 920 are shown with a license plate 930 having text "XYZ ABCD" and a license plate 940 having text "UVW EFGH," respectively. In this case, the text region detection unit 242 in the electronic device 120 may detect a plurality of text regions 950 and 960 in the license plates 930 and 940, respectively. Since the text region 950 is larger in size than the text region 960, the target focus region detection unit 244 in the electronic device 120 may identify the text region 950 as a target focus region in the preview image 900. The target focus region detection unit 244 may also identify the text region 950 as the target focus region by determining that a text size of the text region 950 is larger than a text size of the text region 960.

The image sensor control unit 246 in the electronic device 120 may receive the target focus region 950 and determine whether the target focus region 950 is associated with a reference object. For example, the image sensor control unit 246 may compare the target focus region 950 with a plurality of reference objects (e.g., license plates, price tags, etc.) stored in the storage unit 220 of the electronic device 120. The target focus region 950 may then be determined to be a license plate and the size information for the license plate may be retrieved from the storage unit 220. In one embodiment, the size information for the license plate may include at least one of a license plate size and one or more sizes for a plurality of characters in the license plate.

If the target focus region 950 is determined to be the license plate, the image sensor control unit 246 may detect a size of the target focus region 950 or a size of each of characters "XYZ ABCD" in the target focus region 950. The image sensor control unit 246 may then calculate a value for the focus parameter based on the predetermined focal length associated with the preview image 900, the size information of the reference license plate, and the size of the target focus region 950 or the size of the characters in the target focus region 950. The focus parameter for the image sensor 130 may then be adjusted to the focus parameter value. Since the focus parameter value is determined based on an actual size of text for the target focus region 950, using such a parameter value may be optimized or suited for the target focus region 950 in capturing an image.

In one embodiment, the focus parameter value may be determined based on a geometric relationship of an actual text size of the reference license plate, a detected size of characters in the target focus region 950, and a focal length for the preview image 900. For example, such a relationship may be defined by a matrix equation as follows:

$$\begin{bmatrix} x \\ y \end{bmatrix} = \begin{bmatrix} fX/Z \\ fY/Z \end{bmatrix} \quad \text{(Equation 1)}$$

where x and y are detected size of characters in an x and y coordinate space for a target focus region, f is a focal length of a preview image, X and Y are actual text sizes in an x and y coordinate space of a reference object, and Z is the focus parameter.

Figure 10:
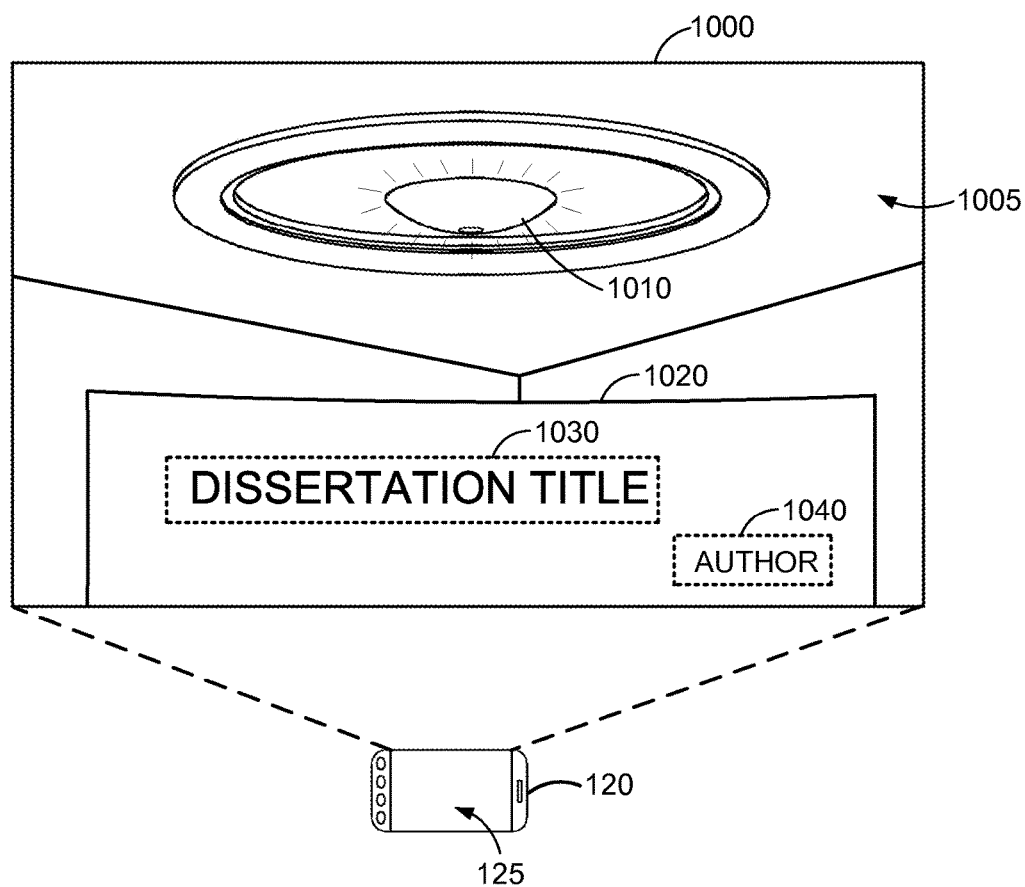
FIG. 10 illustrates a preview image of an indoor scene including a light source and a portion of a document as displayed on a display screen of an electronic device according to one embodiment of the present disclosure.

FIG. 10 illustrates a preview image 1000 of an indoor scene including a light source 1010 and a portion of a document 1020 as displayed on the display screen 125 of the electronic device 120 according to one embodiment of the present disclosure. When a text mode is selected among a plurality of camera modes, the electronic device 120 may capture and display the preview image 1000 on the display screen 125 for the user 110. In the preview image 1000, the light source 1010 is located in a ceiling 1005 and emits light. The preview image 1000 also shows the portion of the document 1020 including a plurality of text regions 1030 and 1040. The text region 1030 includes text for "DISSERTATION TITLE" and the text region 1040 includes text for "AUTHOR."

As the preview image 1000 is captured, the text region detection unit 242 of the electronic device 120 may detect the text regions 1030 and 1040 in the preview image 1000. The target focus region detection unit 244 may compare sizes of characters in the text regions 1030 and 1040, and select the text region 1030 with larger character sizes as a target focus region. The target focus region 1030 may then be provided to the image sensor control unit 246 in the electronic device 120.

Upon receiving the target focus region 1030, the image sensor control unit 246 may determine a brightness value for the target focus region 1030. In one embodiment, the brightness value may be calculated based on color values for a plurality of pixels in the target focus region 1030. For example, the image sensor control unit 246 may determine the brightness value for the target focus region 1030 by averaging a plurality of brightness values for the plurality of pixels in the target focus region 1030. In this case, a brightness value may be calculated as an arithmetic mean of color values (e.g., red, green, and blue values) for each pixel.

When the brightness value of the target focus region 1030 is determined, the image sensor control unit 246 may calculate a difference between the brightness value of the target focus region 1030 and a predetermined brightness value. The predetermined brightness value, which may be accessed from in the storage unit 220, is a brightness value optimized or suited for capturing text in a document. The image sensor control unit 246 may then adjust the exposure parameter for the image sensor 130 to an exposure parameter value that reduces or eliminates the difference between the brightness value of the target focus region 1030 and the predetermined brightness value.

In the illustrated preview image 1000, the document 1020 is located near the electronic device 120 such that the light source 1010 emits light from a position behind and over the document 1020. Accordingly, the brightness value of the target focus region 1030 may be lower, and thus appear darker, than other regions in the preview image 1000. In this case, the image sensor control unit 246 may determine an exposure parameter value (e.g., exposure time, aperture, etc.) adapted to increase the brightness value of the target focus region 1030 by the difference between the brightness value of the target focus region 1030 and the predetermined brightness value. The exposure parameter for the image sensor 130 may then be adjusted to the determined exposure parameter value and provided to the image sensor 130 for use in capturing an image of the document 1020.

Figure 11:
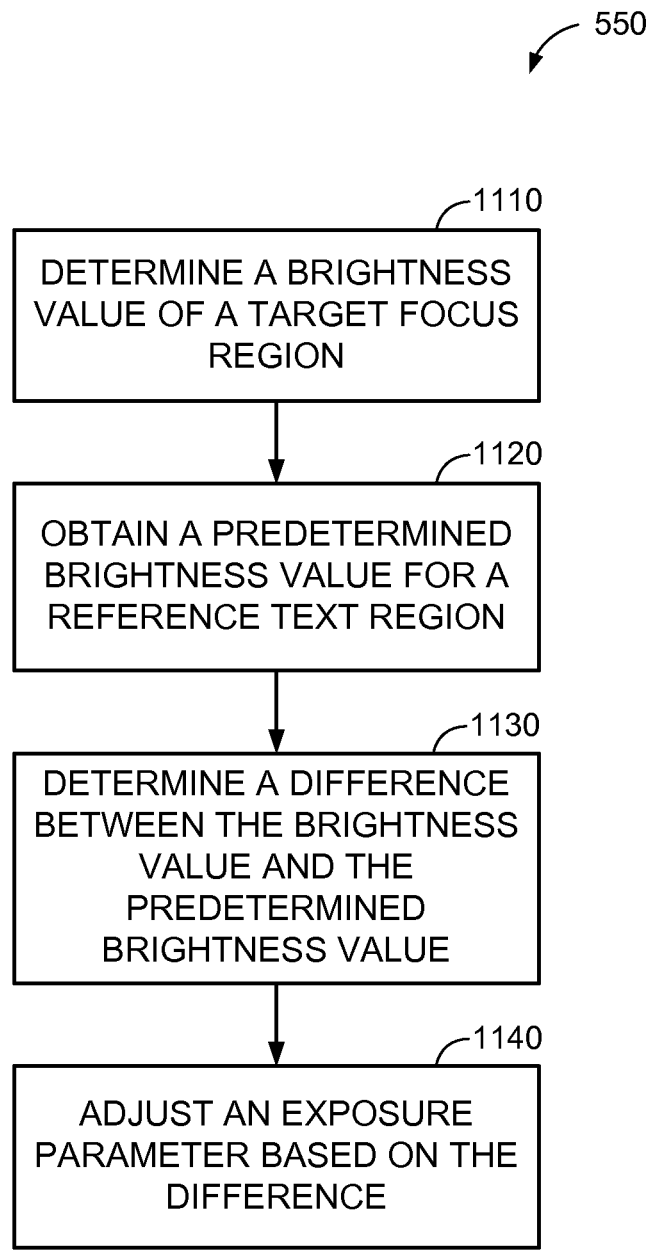
FIG. 11 is a flowchart of a method for adjusting an exposure parameter for an image sensor based on a brightness value of a target focus region in a preview image according to one embodiment of the present disclosure.

FIG. 11 is a flow chart of a detailed method 550 for adjusting an exposure parameter for the image sensor 130 based on a brightness value of a target focus region in a preview image according to one embodiment of the present disclosure. The image sensor control unit 246 may determine a brightness value of the target focus region, which may be selected from a plurality of text regions in a preview image, at 1110. The preview image including the target focus region may be captured in a text mode based on a set of image capturing parameters including the exposure parameter.

From the storage unit 220, the image sensor control unit 246 may obtain a predetermined brightness value for a reference text region that may indicate a brightness value optimized or suited for capturing text in a text object, at 1120. At 1130, a difference between the brightness value of the target focus region and the predetermined brightness value may be determined. The image sensor control unit 246 may then adjust the exposure parameter for the image sensor 130 based on the difference between the brightness value of the target focus region and the predetermined brightness value, at 1140.

Figure 12:
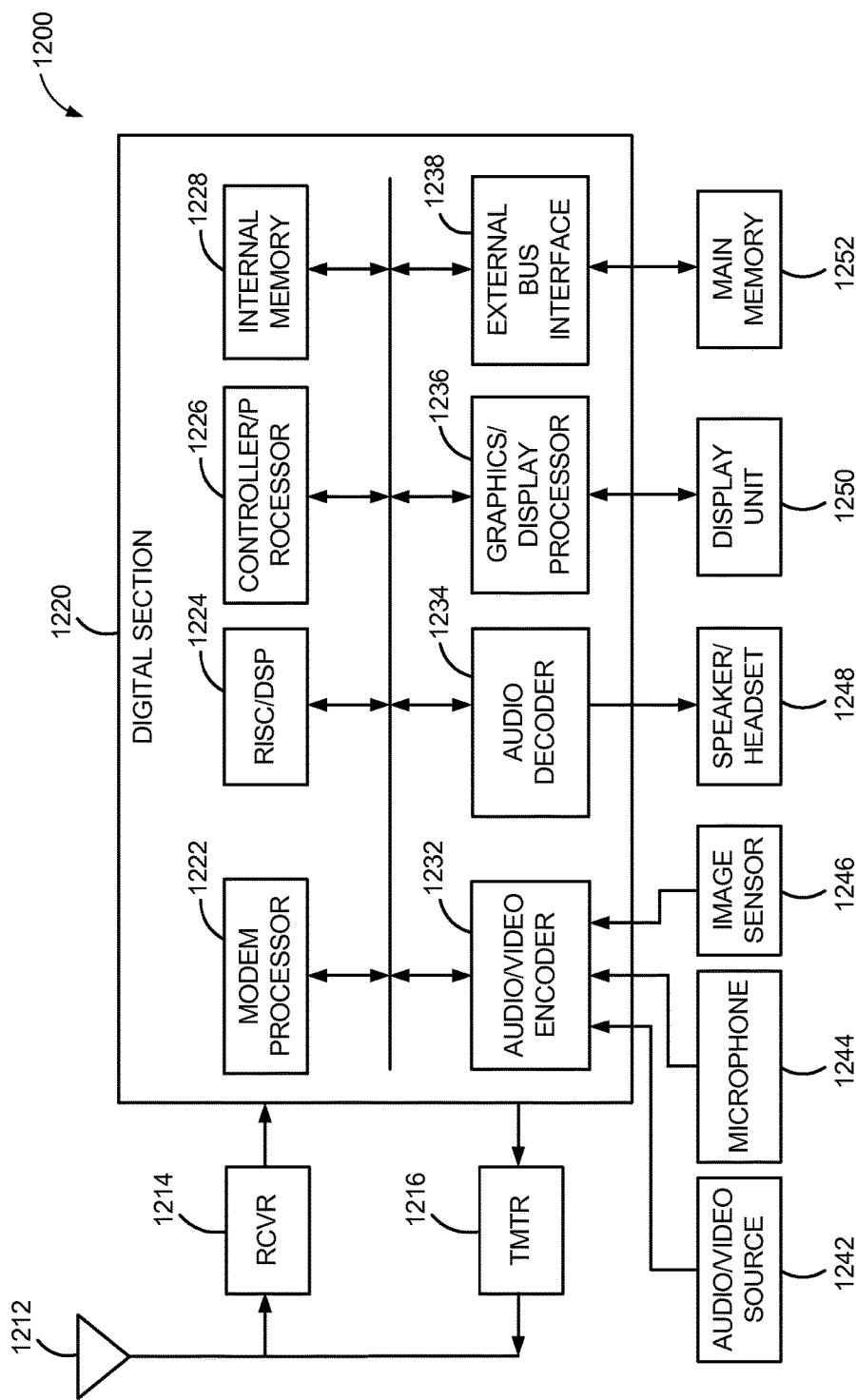
FIG. 12 illustrates a block diagram of an exemplary electronic device in which the methods and apparatus for adjusting at least one image capturing parameter in a preview mode may be implemented, according to one embodiment of the present disclosure.

FIG. 12 is a block diagram of an exemplary electronic device 1200 in which the methods and apparatus for adjusting at least one image capturing parameter in a preview state may be implemented, according one embodiment of the present disclosure. The configuration of the electronic device 1200 may be implemented in the electronic devices according to the above embodiments described with reference to FIGS. 1 to 11. The electronic device 1200 may be a cellular phone, a smartphone, a tablet computer, a laptop computer, a terminal, a handset, a personal digital assistant (PDA), a wireless modem, a cordless phone, etc. The wireless communication system may be a Code Division Multiple Access (CDMA) system, a Broadcast System for Mobile Communications (GSM) system, Wideband CDMA (WCDMA) system, Long Term Evolution (LTE) system, LTE Advanced system, etc. Further, the electronic device 1200 may communicate directly with another mobile device, e.g., using Wi-Fi Direct or Bluetooth.

The electronic device 1200 is capable of providing bidirectional communication via a receive path and a transmit path. On the receive path, signals transmitted by base stations are received by an antenna 1212 and are provided to a receiver (RCVR) 1214. The receiver 1214 conditions and digitizes the received signal and provides samples such as the conditioned and digitized digital signal to a digital section for further processing. On the transmit path, a transmitter (TMTR) 1216 receives data to be transmitted from a digital section 1210, processes and conditions the data, and generates a modulated signal, which is transmitted via the antenna 1212 to the base stations. The receiver 1214 and the transmitter 1216 may be part of a transceiver that may support CDMA, GSM, LTE, LTE Advanced, etc.

The digital section 1210 includes various processing, interface, and memory units such as, for example, a modem processor 1222, a reduced instruction set computer/digital signal processor (RISC/DSP) 1224, a controller/processor 1226, an internal memory 1228, a generalized audio/video encoder 1232, a generalized audio decoder 1234, a graphics/display processor 1236, and an external bus interface (EBI) 1238. The modem processor 1222 may perform processing for data transmission and reception, e.g., encoding, modulation, demodulation, and decoding. The RISC/DSP 1224 may perform general and specialized processing for the electronic device 1200. The controller/processor 1226 may perform the operation of various processing and interface units within the digital section 1210. The internal memory 1228 may store data and/or instructions for various units within the digital section 1210.

The generalized audio/video encoder 1232 may perform encoding for input signals from an audio/video source 1242, a microphone 1244, an image sensor 1246, etc. The generalized audio decoder 1234 may perform decoding for coded audio data and may provide output signals to a speaker/headset 1248. The graphics/display processor 1236 may perform processing for graphics, videos, images, and texts, which may be presented to a display unit 1250. The EBI 1238 may facilitate transfer of data between the digital section 1210 and a main memory 1252.

The digital section 1210 may be implemented with one or more processors, DSPs, microprocessors, RISCs, etc. The digital section 1210 may also be fabricated on one or more application specific integrated circuits (ASICs) and/or some other type of integrated circuits (ICs).

In general, any device described herein may represent various types of devices, such as a wireless phone, a cellular phone, a laptop computer, a wireless multimedia device, a wireless communication personal computer (PC) card, a PDA, an external or internal modem, a device that communicates through a wireless channel, etc. A device may have various names, such as access terminal (AT), access unit, subscriber unit, mobile station, mobile device, mobile unit, mobile phone, mobile, remote station, remote terminal, remote unit, user device, user equipment, handheld device, etc. Any device described herein may have a memory for storing instructions and data, as well as hardware, software, firmware, or combinations thereof.

The techniques described herein may be implemented by various means. For example, these techniques may be implemented in hardware, firmware, software, or a combination thereof. Those of ordinary skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, the various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

For a hardware implementation, the processing units used to perform the techniques may be implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

Thus, the various illustrative logical blocks, modules, and circuits described in connection with the disclosure herein are implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternate, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored on or transmitted over as one or more instructions or code on a computer-readable medium. Computer-readable media include both computer storage media and communication media including any medium that facilitates the transfer of a computer program from one place to another. A storage media may be any available media that can be accessed by a computer. By way of example, and not limited thereto, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Further, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc, where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein are applied to other variations without departing from the spirit or scope of the disclosure. Thus, the disclosure is not intended to be limited to the examples described herein but is to be accorded the widest scope consistent with the principles and novel features disclosed herein.

Although exemplary implementations are referred to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices may include PCs, network servers, and handheld devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method, performed by an electronic device with an image sensor, for capturing at least one image, the method comprising:
    capturing a preview image of a scene including at least one text object;
    identifying a plurality of text regions in the preview image;
    selecting a target focus region from the plurality of text regions;
    determining at least one brightness value associated with the target focus region;
    comparing the at least one brightness value to a threshold value; and
    adjusting at least one image capturing parameter for the image sensor based on the comparison.

2. The method of claim 1, wherein identifying the plurality of text regions comprises:
    detecting a plurality of candidate text regions in the preview image; and
    identifying the plurality of text regions from the plurality of candidate text regions.

3. The method of claim 1, further comprising capturing an image including the at least one text object based on the at least one image capturing parameter.

4. The method of claim 1, wherein the at least one image capturing parameter comprises at least one of a focus parameter, an exposure parameter, a white balance parameter, a contrast enhancement parameter, a zoom parameter, or a sensitivity to light parameter.

5. The method of claim 4, wherein adjusting the at least one image capturing parameter comprises:
    capturing at least one preview image including the target focus region based on at least one candidate focus parameter;
    selecting a candidate focus parameter associated with the target focus region having a highest sharpness value; and
    adjusting the focus parameter in the at least one image capturing parameter to the selected candidate focus parameter.

6. The method of claim 4, wherein adjusting the at least one image capturing parameter comprises adjusting the exposure parameter in the at least one image capturing parameter.

7. A method, performed by an electronic device with an image sensor, for capturing at least one image, the method comprising:
    capturing at least one preview image of a scene including at least one text object based on at least a focus parameter of a plurality of image capturing parameters;

identifying a plurality of text regions in the at least one preview image;
selecting a target focus region from the plurality of text regions;
identifying a reference object based on the target focus region;
determining a geometric relationship between the target focus region and the reference object; and
adjusting the focus parameter based on the geometric relationship.

8. The method of claim 1, wherein selecting the target focus region from the plurality of text regions comprises:
determining a plurality of sizes of the plurality of text regions; and
selecting the target focus region from the plurality of text regions based on the plurality of sizes.

9. The method of claim 2, wherein identifying the plurality of text regions from the plurality of candidate text regions comprises:
extracting a plurality of features from the plurality of candidate text regions;
determining a plurality of classification scores based on the plurality of features; and
identifying the plurality of text regions from the plurality of candidate text regions based on the plurality of classification scores.

10. The method of claim 9, wherein selecting the target focus region from the plurality of text regions comprises:
identifying one of the plurality of text regions having a greatest classification score; and
selecting the identified text region as the target focus region.

11. The method of claim 2, wherein identifying the plurality of text regions from the plurality of candidate text regions comprises:
determining locations of candidate text regions in the preview image;
obtaining a plurality of candidate text regions from another preview image of the scene based on the locations of the candidate text regions in the preview image, wherein the other preview image of the scene has a resolution higher than the preview image; and
identifying the plurality of text regions based on the plurality of candidate text regions obtained from the other preview image.

12. An electronic device with an image sensor for capturing at least one image, comprising:
an image sensor configured to capture a preview image of a scene including at least one text object;
a text region detection unit configured to identify a plurality of text regions in the preview image;
a target focus region detection unit configured to select a target focus region from the plurality of text regions; and
an image sensor control unit configured to:
determine at least one brightness value associated with the target focus region;
compare the at least one brightness value to a threshold value; and
adjust at least one image capturing parameter for the image sensor based on the comparison.

13. The electronic device of claim 12, wherein the text region detection unit is configured to:
detect a plurality of candidate text regions in the preview image; and
identify the plurality of text regions from the plurality of candidate text regions.

14. The electronic device of claim 12, wherein the image sensor is further configured to capture an image including the at least one text object based on the at least one image capturing parameter.

15. The electronic device of claim 12, wherein the at least one image capturing parameter comprises at least one of a focus parameter, an exposure parameter, a white balance parameter, a contrast enhancement parameter, a zoom parameter, or a sensitivity to light parameter.

16. The electronic device of claim 15, wherein the image sensor is further configured to capture at least one preview image including the target focus region based on at least one candidate focus parameter.

17. The electronic device of claim 15, wherein the image sensor control unit is configured to:
select a candidate focus parameter associated with the target focus region having a highest sharpness value; and
adjust the focus parameter in the at least one image capturing parameter to the selected candidate focus parameter.

18. The electronic device of claim 15, wherein the image sensor control unit is configured to adjust the exposure parameter in the at least one image capturing parameter.

19. An electronic device with an image sensor for capturing at least one image, comprising:
an image sensor configured to capture at least one preview image of a scene including at least one text object based on a focus parameter of a plurality of image capturing parameters;
a text region detection unit configured to identify a plurality of text regions in the at least one preview image;
a target focus region detection unit configured to select a target focus region from the plurality of text regions;
an image sensor control unit configured to identify a reference object based on the target focus region and to determine a geometric relationship between the target focus region and the reference object, wherein the image sensor control unit is configured to adjust the focus parameter based on the geometric relationship.

20. The electronic device of claim 12, wherein the target focus region detection unit is configured to:
determine a plurality of sizes of the plurality of text regions; and
select the target focus region from the plurality of text regions based on the plurality of sizes.

21. The electronic device of claim 13, wherein the text region detection unit is configured to:
extract a plurality of features from the plurality of candidate text regions;
determine a plurality of classification scores based on the plurality of features; and
identify the plurality of text regions from the plurality of candidate text regions based on the plurality of classification scores.

22. The electronic device of claim 21, wherein the target focus region detection unit is configured to:
identify one of the plurality of text regions having a greatest classification score, and
select the identified text region as the target focus region.

23. The electronic device of claim 13, wherein the text region detection unit is configured to:
determine locations of candidate text regions in the preview image;
obtain a plurality of candidate text regions from another preview image of the scene based on the locations of the candidate text regions in the preview image, the other preview image of the scene having a resolution higher than the preview image; and identify the plurality of text regions based on the plurality of candidate text regions obtained from the other preview image.

24. A non-transitory computer-readable storage medium comprising instructions for capturing at least one image, the instructions causing a processor of an electronic device with an image sensor to perform the operations of:

capturing a preview image of a scene including at least one text object;

identifying a plurality of text regions in the preview image;

selecting a target focus region from the plurality of text regions;

determining at least one brightness value associated with the target focus region;

comparing the at least one brightness value to a threshold value; and adjusting at least one image capturing parameter for the image sensor based on the comparison.

25. The medium of claim 24, wherein the at least one image capturing parameter comprises at least one of a focus parameter, an exposure parameter, a white balance parameter, a contrast enhancement parameter, a zoom parameter, or a sensitivity to light parameter.

26. The medium of claim 25, wherein adjusting the at least one image capturing parameter comprises:

capturing at least one preview image including the target focus region based on at least one candidate focus parameter;

selecting a candidate focus parameter associated with the target focus region having a highest sharpness value; and adjusting the focus parameter in the at least one image capturing parameter to the selected candidate focus parameter.

27. The medium of claim 25, wherein adjusting the at least one image capturing parameter comprises adjusting the exposure parameter in the at least one image capturing parameter.

28. An electronic device with an image sensor for capturing at least one image comprising:

means for capturing a preview image of a scene including at least one text object;

means for identifying a plurality of text regions in the preview image;

means for selecting a target focus region from the plurality of text regions;

means for determining at least one brightness value associated with the target focus region;

means for comparing the at least one brightness value to a threshold value; and means for adjusting at least one image capturing parameter for the image sensor based on the comparison.

29. The electronic device of claim 28, wherein the at least one image capturing parameter comprises at least one of a focus parameter, an exposure parameter, a white balance parameter, a contrast enhancement parameter, a zoom parameter, or a sensitivity to light parameter.

30. The electronic device of claim 29, wherein the means for adjusting the at least one image capturing parameter is configured to:

capture at least one preview image including the target focus region based on at least one candidate focus parameter;

determine at least one sharpness value of the target focus region in the at least one preview image;

select a candidate focus parameter having a highest sharpness value from the at least one candidate focus parameter; and adjust the focus parameter in the at least one image capturing parameter to the selected candidate focus parameter.

* * * * *